J. WHITTEMORE.
APPARATUS FOR MAKING SHEET GLASS.
APPLICATION FILED MAY 16, 1918.

1,328,864.

Patented Jan. 27, 1920.

INVENTOR
James Whittemore
By J. F. Rule,
His attorney.

UNITED STATES PATENT OFFICE.

JAMES WHITTEMORE, OF DETROIT, MICHIGAN, ASSIGNOR TO THE LIBBEY-OWENS SHEET GLASS COMPANY, OF TOLEDO, OHIO, A CORPORATION OF OHIO.

APPARATUS FOR MAKING SHEET-GLASS.

1,328,864.  Specification of Letters Patent.  Patented Jan. 27, 1920.

Application filed May 16, 1918. Serial No. 234,867.

*To all whom it may concern:*

Be it known that I, JAMES WHITTEMORE, a citizen of the United States, residing at Detroit, in the county of Wayne and State of Michigan, have invented new and useful Improvements in Apparatus for Making Sheet-Glass, of which the following is a specification.

My invention relates to means for removing the excess moisture from the wet surface of a wooden roll or other wet surface designed to be brought in contact with hot glass.

In the method of making sheet glass by drawing the glass upwardly from a pool in a continuous sheet and over a bending roll, it has been proposed to make the bending roll of wood or other material which will not mar the glaze which forms on the surface of the glass as it approaches the roll. In order to prevent overheating of the roll, moisture is supplied continuously to the surface of the roll as by means of a trough of water in which the roll runs. It is found in practice that there is a tendency for an excess of water to be carried upward and to be unevenly distributed or collect in drops on the surface of the roll. These drops when carried between the roll and hot glass are vaporized by the heat and the confined steam thus produced causes irregular and excessive pressure on the surface of the plastic glass, resulting in irregularities in the finished glass.

An object of my invention is to overcome the above objection. For this purpose I provide means by which a movement of air over the surface of the roll is produced in a manner to remove excessive moisture. Such means is preferably in the nature of a suction device comprising a hood or inverted trough extending lengthwise of the roll and forming therewith a suction chamber. By exhausting air from said chamber any excess moisture is withdrawn from the surface of the roll as it passes the trough, so that there is a uniform distribution of moisture on the surface with which the glass comes in contact.

Other features and advantages of the invention will appear hereinafter.

Referring to the accompanying drawings.

Figure 1:
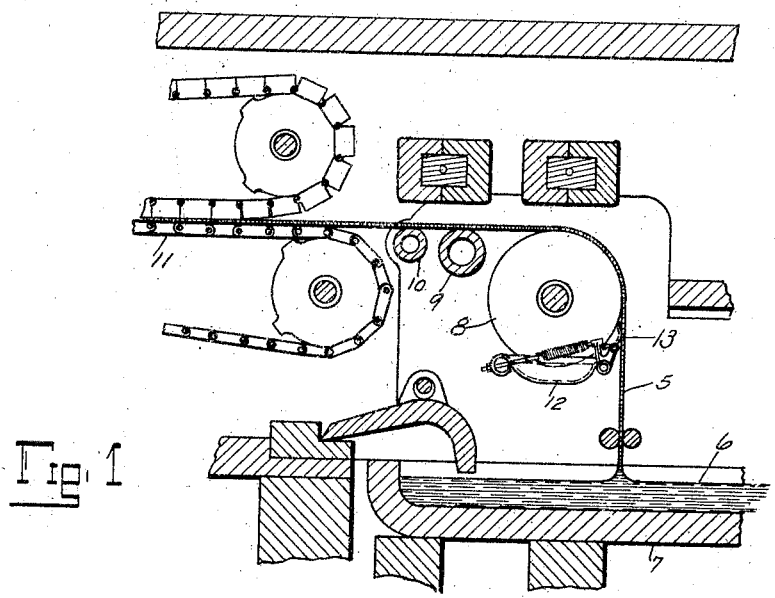
Figure 1 is a sectional elevation of sheet glass forming apparatus to which my invention is applied.
Figure 2:
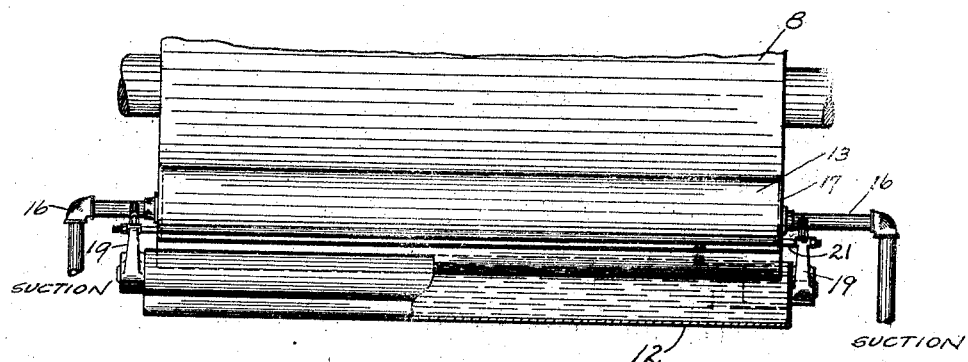
Fig. 2 is a fragmentary elevation of the bending roll and suction apparatus, on a larger scale.
Figure 3:
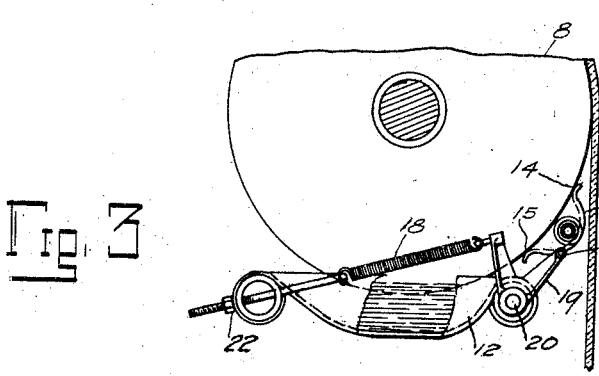
Fig. 3 is a sectional end elevation of the same.

The present invention is an improvement on the invention disclosed in the application of Thomas S. Owens, for apparatus for making sheet glass, filed August 11, 1917, Serial Number 185,754.

The glass is drawn in a continuous sheet 5 from a pool 6 of molten glass in the receptacle 7, which may consist of a boot or extension of a continuous melting furnace. The glass is drawn upward over a sheet bending roll 8 by which the sheet is bent or deflected to a horizontal direction, and then passes over rolls 9, 10 and a drawing table 11 into an annealing oven. The roll 8 is made of wood or other suitable material providing a surface which will not mar the thin glaze which has formed on the surface of the glass during its upward movement from the tank to the bending roll. In order to prevent the bending roll from becoming overheated and also to provide a better surface for the glass to slide over, suitable means are provided for keeping said surface wet or damp. Such means may comprise a trough 12 in which water is circulated. The lower surface of the roll runs in the water so that the surface with which the glass comes in contact is always damp or wet. This moisture when not excessive is beneficial, as it is vaporized by the hot glass and forms a thin film or cushion of steam between the roll and glass, which reduces friction and tends to prevent abrasion or marring of the surface of the glass.

In order to prevent the water from being carried upward to the glass in drops, unevenly, or in excessive amounts, I have provided means for drawing off the surplus moisture. This means as shown comprises a hood or trough 13 extending lengthwise of the roll and having upper and lower edges 14 and 15 respectively, extending along the roll in contact therewith. This hood forms with the roll a chamber or compartment in which a partial vacuum is maintained by means of any suitable suction pump or vacuum apparatus communicating with said chamber through a suction pipe or pipes 16. These pipes communicate with the interior of said chamber through the otherwise closed ends 17 of the hood.

The hood 13 is held against the roll by springs 18 acting through bell cranks 19 pivoted at 20. The bell cranks are connected to a rod 21 extending lengthwise of the hood so that a substantially uniform pressure is applied throughout the length of the hood. The tension of the springs 18 may be regulated by adjusting nuts 22.

It will be noted that the spring pressure is applied to the hood 13 below the center thereof or nearer to the lower line of contact 15 than to the upper line 14, so that the pressure is considerably greater at the lower line of contact. With this arrangement the tendency of the partial vacuum within the chamber 13 is to produce a downward movement of air along the line 14, thereby effectually preventing any drops of water or excessive moisture being carried upward with the roll beyond the hood. The greater pressure along the line of contact 15 provides a more nearly air tight connection along said line and thus overcomes or substantially reduces the tendency of water to be carried up or drawn by the suction into the hood.

Although in the preferred form of my invention, circulation of air through the hood 13 is produced by suction, air under pressure might in some instances be circulated through the hood. In this case the pressure of the hood at the lower edge 15 may be made less than at the upper edge, so that the tendency of the air under pressure is to blow downward between the roll and the lower edge of the hood, thus preventing the water from being carried upward past said lower edge.

Variations may be resorted to within the spirit and scope of my invention.

What I claim is:

1. In apparatus for manipulating hot glass, the combination of means providing a glass engaging surface, means to supply moisture to said surface, and means to remove excess moisture from said surface by suction.

2. In apparatus for manipulating hot glass, the combination of means providing a glass engaging surface, means to supply moisture to said surface, and means to control the amount of moisture on said surface by a differential air pressure thereon.

3. In apparatus for manipulating hot glass, the combination of means providing a glass engaging surface, means to supply moisture to said surface, and means to remove excess moisture by movement of air over said surface.

4. In apparatus for forming sheet glass, the combination of a roll over which a sheet of glass is drawn, means to supply liquid to the surface of the roll, and means to remove excess liquid from said surface by a movement of air thereover.

5. In apparatus for forming sheet glass, the combination of a roll over which a sheet of glass is drawn, means to supply liquid to the surface of the roll, and means to produce a circulation of air on the surface of the roll between the line of contact of the glass with the roll and the point of application of the liquid.

6. In sheet glass forming apparatus the combination with a roll, of means for passing a sheet of hot glass over the roll, means to apply a cooling liquid to the roll, and means for removing excess moisture from the surface of the roll between the point at which the moisture is applied and the point of contact with the glass by a movement of air over said surface.

7. In sheet glass forming apparatus the combination with a roll, of means for passing a sheet of hot glass over the roll, means to apply a cooling liquid to the roll, and means for causing a downward movement of air against the surface of the roll between the line of contact with the glass and the line of application of the moisture.

8. In sheet glass forming apparatus, the combination with a rotating wooden roll over which a sheet of plastic glass is drawn, of means for applying a cooling liquid to the roll, and means between the point of application of the liquid and the glass for circulating air over the surface of the roll in a direction opposite to that in which the surface moves.

9. The combination of a sheet bending roll, means for applying a cooling liquid thereto, a hood extending lengthwise of the roll and forming therewith an inclosed chamber, and means for exhausting the air therefrom.

10. The combination with means for drawing a continuous sheet of glass from a pool of molten glass, a wooden bending roll over which the sheet is drawn, a trough beneath the roll to contain water in which the lower surface of the roll runs, a hood extending lengthwise of the roll between said trough and the sheet of glass, said hood having upper and lower edges bearing against the roll so that it forms with the roll an inclosed compartment or chamber, and means for exhausting air from said chamber.

11. The combination with means for drawing a continuous sheet of glass from a pool of molten glass, a wooden bending roll over which the sheet is drawn, a trough beneath the roll to contain water in which the lower surface of the roll runs, a hood extending lengthwise of the roll between said trough and the sheet of glass, said hood having upper and lower edges bearing against the roll so that it forms with the roll an inclosed compartment or chamber, means for exhausting air from said chamber, and means for holding the hood with a yielding pressure against the roll, the pressure along the upper line of contact with the roll being less than along the lower line of contact, whereby there is a downward movement of air along said upper line of contact into said chamber.

12. In apparatus for handling hot glass, the combination of means providing a surface to be brought in contact with the hot glass, means to apply a liquid to said surface, and means to pneumatically remove portions of the liquid from said surface.

13. In apparatus for handling hot glass, the combination of means providing a surface to be brought in contact with the hot glass, means to apply a liquid to said surface, and means to pneumatically produce an even distribution of the liquid on said surface.

14. In a machine for making sheet glass, the combination of a drawing apparatus, a rotating bending roll, means for applying a cooling liquid to the surface thereof, a scraper for removing surplus water on the up-moving face, and means beyond the scraper for removing surplus water that may pass the scraper.

15. In a machine for making sheet glass, the combination of a drawing apparatus, a rotating bending roll, means for applying a cooling liquid to the surface thereof, a scraper for removing surplus water on the up-moving face, and pneumatic means beyond the scraper for removing surplus water that may pass the scraper.

Signed at Detroit, in the county of Wayne, and State of Michigan, this 10th day of May, 1918.

JAMES WHITTEMORE.